(12) United States Patent
Kolinummi et al.

(10) Patent No.: US 7,734,939 B2
(45) Date of Patent: Jun. 8, 2010

(54) ADAPTIVE VOLTAGE ADJUSTMENT

(75) Inventors: Pasi Kolinummi, Kangasala (FI); Erkki Nokkonen, Tampere (FI); Mike Jager, Camberley Surrey (GB)

(73) Assignee: Nokia Corporation, Espoo (FI)

( * ) Notice: Subject to any disclaimer, the term of this patent is extended or adjusted under 35 U.S.C. 154(b) by 654 days.

(21) Appl. No.: 11/632,584

(22) PCT Filed: Jul. 15, 2004

(86) PCT No.: PCT/IB2004/002301

§ 371 (c)(1),
(2), (4) Date: Jan. 16, 2007

(87) PCT Pub. No.: WO2006/010988

PCT Pub. Date: Feb. 2, 2006

(65) Prior Publication Data

US 2007/0247216 A1 Oct. 25, 2007

(51) Int. Cl.
G06F 1/26 (2006.01)
(52) U.S. Cl. .................. 713/320; 713/300; 327/544
(58) Field of Classification Search .................. 713/300, 713/320; 327/544
See application file for complete search history.

(56) References Cited

U.S. PATENT DOCUMENTS

| 5,630,110 A | 5/1997 | Mote, Jr. et al. |
| 5,648,766 A * | 7/1997 | Stengel et al. ......... 340/870.39 |
| 5,727,208 A | 3/1998 | Brown |
| 6,367,023 B2 * | 4/2002 | Kling et al. .................. 713/340 |
| 6,868,500 B1 * | 3/2005 | Kutz et al. ................... 713/300 |
| 6,901,524 B2 * | 5/2005 | Watts, Jr. ..................... 713/322 |
| 6,947,865 B1 * | 9/2005 | Mimberg et al. ............ 702/130 |
| 7,032,117 B2 * | 4/2006 | Kolinummi et al. ......... 713/300 |
| 7,366,928 B2 * | 4/2008 | Park .......................... 713/310 |
| 7,409,315 B2 * | 8/2008 | Kim et al. ................... 702/182 |
| 7,412,614 B2 * | 8/2008 | Ku .............................. 713/321 |
| 7,423,475 B2 * | 9/2008 | Saha et al. .................. 327/543 |
| 2003/0120961 A1 | 6/2003 | Cooper |

OTHER PUBLICATIONS

European Article 94(3) Communication (Application No. 04 743 962.5-1245) dated Sep. 29, 2008, Form 2001 (1 page) and Form 2906 (3 pages).

* cited by examiner

Primary Examiner—Chun Cao

(57) ABSTRACT

A method, system, module, apparatus, use, and computer program product are shown for determining a supply voltage level for operating an integrated circuit. To allow exact voltage level calibration, a high load condition is provided to the integrated circuit, a first voltage level of the integrated circuit is adjusted to provide a stable operation of the integrated circuit in the high load condition, a temperature of the integrated circuit in the high load condition is measured, the measured temperature in the high load condition is stored along with the adjusted first voltage level in the high load condition.

41 Claims, 3 Drawing Sheets

ADAPTIVE VOLTAGE ADJUSTMENT

CROSS-REFERENCE TO RELATED APPLICATION

This application is the U.S. National Stage of International Application Number PCT/D32004/002301 filed Jul. 15, 2004 published in English Feb. 2, 2006 under International Publication Number WO 2006/010988 A1.

BACKGROUND

The invention relates in general to a method, a system, a module, a computer program product and a use of such systems or modules for determining a supply voltage level for operating an integrated circuit.

Operating speed of integrated circuits, in particular based on silicon technology, depends on silicon process variations, voltage variations, and temperature variations. These variations may influence the integrated circuit also in terms of operating and processor speed. In integrated circuits with a frequency of about 400 to 500 MHz, the voltage dependency may be about 1 MHz/mV. From these values, it is apparent that feeding the integrated circuit with the correct voltage may be a crucial task in operating integrated circuits. For instance, a 100 mV voltage change may cause 100 MHz difference in CPU maximum operating frequency.

Besides the variations in processor speed due to voltage variations, the silicon technology has the drawback of a variance caused by process tolerances, in particular during silicon manufacturing. Variations in the material may cause about 30% speed variation, independent of voltage. This means that the weakest integrated circuits, with materials which provide the weakest performance, may be 30% slower than the strongest circuits, with materials which allow high performance.

Besides the voltage dependency, and the material variation, temperature variations may also cause processor speed variations. In 1V technology, temperature variations may cause more than 5% of processor speed variation. In addition, rising temperature may cause rising resistance in the integrated circuit. The voltage drop (IR-drop) inside the integrated circuit increases with increasing temperature. Therefore, temperature variation may weaken the computation speed by two mechanisms. This is the intrinsic variation due to temperature variation as well as the extrinsic variation due to the IR-drop. The IR drop may be caused due to temperature variation in the integrated circuit itself, in bonding pads, bonding wires and within the printed wiring board. The higher the supply voltage, the higher the power consumption within the processor. In particular with processors running at low voltages, a small reduction of the supply voltage results in a significant reduction in relative power consumption within the processor.

During operating of an integrated circuit, a controller for regulating the voltage of the integrated circuit is required to provide the integrated circuit with voltages enabling reliable operation in all conditions. These conditions may be characterized by two extreme points. One extreme may be detected for integrated circuits fed by low voltage, having weak silicon and running with high temperature. Accumulation of these factors leads to weakest performance in terms of processor speed. On the other hand, best performance in terms of processor speed may be achieved with high voltage, strong silicon and low temperature. Current design rules require integrated circuits to work reliably within these extreme conditions.

To provide reliable operation, safety margins are introduced. These safety margins are needed to guarantee reliable operation in different operation conditions and with different silicon. The safety margins are applied to the supply voltages applied to the integrated circuits.

It has already been proposed to track process variations and other variations and to compensate these by applying variable voltage to the integrated circuit. However, the suggested methods require a voltage margin to account for transient conditions in the integrated circuit. The changes in operation conditions are too fast to compensate for without safety margins.

In particular in high load conditions, where many operations within the integrated circuits are processed, power consumption in the integrated circuit is high. In high load conditions, the integrated circuits consume a few hundred milliamperes, for instance 500 mA. During stand-by mode, in low load conditions, where only few operations within the integrated circuit are processed, power consumption in the integrated circuit is low. It may in low load mode be in the order of a few tens of milliamperes.

In particular the high load condition, for instance, a high speed data call of a mobile phone or an operation mode for video, audio or any other multimedia application consumes the most energy. A decrease in energy consumption in high load conditions may provide the best results in terms of power consumption.

Therefore, one object of the invention is to reduce power consumption in high load conditions. Another object of the invention is to reduce power consumption in integrated circuits. A further object of the invention is increasing operation time of electronics or mobile communication devices. Another object of the invention is to account for dynamic changes in processor speed and system load. Also system variations, silicon variations, temperature variations, and IR-drop variations should be compensated for.

SUMMARY OF THE INVENTION

To overcome the above mentioned problems, the invention provides a method for determining a supply voltage level for operating an integrated circuit by providing a high load condition to the integrated circuit, adjusting a first voltage level of the integrated circuit to provide a stable operation of the integrated circuit in the high load condition, and storing the adjusted first voltage level in the high load condition.

It is also proposed to measure a temperature of the integrated circuit in the high load condition, and to store the measured temperature.

A high load condition of the integrated circuit may be a condition with a high number of computational tasks. This may be provided by running the integrated circuit with a test program, for instance embedded within the device itself, requesting a high amount of computational tasks. A voltage level may be applied to the integrated circuit in the high load condition where stable operation is provided. This voltage level may be the minimum level, where the system operates reliably. The adjusted first voltage level may be stored. The first voltage level may provide at this operation point reliable operation of the integrated circuit.

A temperature dependent monitor may determine the temperature of the system in a high load condition. The measured temperature, the load condition and the voltage level may determine a high load condition.

To provide better information about conditions of the integrated circuit in a high load condition, embodiments provide measuring electric properties within the integrated circuit in the high load condition, and storing the electric property in the high load condition.

Running the integrated circuit in a high load condition, adjusting the first voltage level and measuring temperature and/or electric properties may be done in a start-up phase or any other calibration phase, which may be initiated during operation of the integrated circuit. When the integrated circuit is powered on, the respective values may be measured. With these measured values, an operating point in the high load condition may be determined.

Embodiments provide adjusting the voltage level during normal operation in a high load condition with the stored first voltage level. Insofar, operating the integrated circuit may always be done with a voltage level providing reliable operation. The previously determined first voltage level allows reliable operation even in a high load condition.

Providing safety margins in high load conditions with high temperature results in high power consumption. For instance, reducing the average voltage level by 100 mV in a high load condition, with an operating voltage of 1V, may result in 20% reduction in power consumption.

Embodiments provide adjusting the voltage level during operation in a high load condition with the stored first level plus a voltage margin of smaller than 10% of the first voltage level. The idea is to reduce the safety margin in high load, high temperature conditions. The reduction of the voltage margin in a high load condition results in significant reduction of average power consumption.

In a high load, high temperature condition, variations need not to be compensated for. The operation condition may not worsen. High load and high temperature are already the worst operation conditions. Worse transient variation is not possible anymore. Material variation has already been accounted for during measuring the first voltage level. Therefore, the first voltage level provides stable operation even in worst operation conditions. Insofar, the voltage margin may also be zero or as close to zero as measurement accuracy allows. Embodiments provide adjusting the voltage level during operating in a high load condition with the stored first voltage level plus a voltage margin close to zero. Keeping the voltage level zero or close to zero in high load condition, reliable operation may still be possible when providing the first voltage level.

In low load condition, the voltage margin needs to be increased, as in a low load condition, the changes to unfavorable condition due to variations in the environment or the processor loading may be dynamic and need to be compensated for. Nevertheless, as the high load condition power consumption is highest, reducing the voltage margin in high load condition accounts for the most reduction of power consumption.

To determine the operating conditions, embodiments provide measuring electrical properties during operation. The electrical properties may be the frequency of a free-running oscillator, an IR-drop, the voltage or the current in the integrated circuit, or any other suitable electrical property.

Embodiments allow providing a low load condition to the integrated circuit, adjusting a second voltage level of the integrated circuit to provide a stable operation of the integrated circuit in the low load condition and storing the adjusted second voltage level in the low load condition.

It may also be possible to measure a temperature of the integrated circuit in the low load condition and storing the measured temperature in the low load condition. A low load condition of the integrated circuit may be a condition with a low number of computational tasks. This may be provided by running the integrated circuit with a test program requesting a low amount of computational tasks. A voltage level may be applied to the integrated circuit in the low load condition where stable operation is provided. The voltage applied to the integrated circuit may be lower than the voltage applied in high load condition. The adjusted second voltage level may be stored. This value may determine a low load operation point. The second voltage level may provide at this operation point reliable operation of the integrated circuit.

A temperature dependent monitor may in addition determine the temperature of the system in the low load condition. The measured temperature may then be stored together with the adjusted second voltage level. The low load condition may insofar be determined from these two values.

Embodiments provide adjusting the voltage level during operation in a low load condition with the stored second voltage level.

To account for transient variations, in particular temperature and load, embodiments provide for adjusting the voltage level during operation in a low load condition with the stored second voltage level plus a voltage margin greater than zero. For example the voltage margin may be greater than 5% to 10% of the second voltage level. This voltage margin allows compensating transient changes during operation. In low load condition, the operation condition may change quickly. The computational load may increase. The temperature may rise as well. This may worsen the operation condition, which requires higher voltages for stable operation. The controller may not be able to adjust the voltage as quickly as the operation condition may change. The voltage margin therefore provides stable operation even with dynamic changes in the operation condition.

To further determine the properties in a low load condition, embodiments provide measuring an electrical property within the integrated circuit in the low load condition, and storing the electrical property in the low load condition.

From the measurements of voltage level and temperature in high load and low load conditions, minimum and maximum operating points may be determined. From determining the values during booting the integrated circuit, material variations may be accounted for, and variations due to material may be eliminated. In case the measurements are done with maximum and minimum load conditions, and the voltage level and temperature or electrical properties are measured, system conditions are known. Values in-between these previously measured extreme values may be calculated from the operation conditions. Embodiments provide determining an operation point for adjusting the voltage level from the measured temperature and/or electrical property during operating. The voltage level applied to the integrated circuit providing stable operation may then be calculated using the operating point and the previously determined first and second voltage levels. From process and/or hardware load conditions, the operation point for adjusting the voltage level may also be determined. The closer the operating point comes to the high load condition, the lower the safety margin of the voltage level needs to be calculated, as variations may then be compensated for with lower voltage margins. In a low load condition, the change from a favorable operating condition to a less favorable operating condition may happen faster than can be compensated for with dynamic voltage adjustment. Therefore, a voltage margin is needed. However, in a high load condition, no voltage margin is necessary anymore, as the conditions may not decrease to less favorable conditions.

Another aspect of the invention is a system for determining a supply voltage level for operating an integrated circuit, in particular for implementing a previously described method, comprising an integrated circuit, a voltage controller arranged to control the voltage of the integrated circuit, a load determining device arranged to determine the load condition of the integrated circuit, and a storage arranged to store the determined load, wherein the voltage controller is arranged to adjust a first voltage level in a high load condition to provide a stable operation of the integrated circuit.

It may also be possible to provide a temperature dependent measuring device arranged to measure the temperature of the integrated circuit and to provide the measured temperature to the storage for storing same together with the determined load. The measured temperature may increase accuracy of the device.

In such a system, a delay monitor may be provided, which may be voltage dependent, temperature dependent and/or process dependent. In addition, a voltage independent, temperature dependent delay monitor may also be provided. The delay monitor may monitor the operation conditions. A voltage controller may control the voltage of the integrated circuit and may be connected to the integrated circuit via an interface. A load determining device may determine the system load, i.e., the number of operations processed within the integrated circuit. The load may be generated by software and the software may provide the load determining device with information about the current load.

Embodiments provide embedding the temperature dependent measuring device and the load measuring device within the integrated circuit. In such a case, the integrated circuit itself may allow determining its operation point.

To control the integrated circuit, a digital control interface may be provided according to embodiments. This digital control interface may connect the integrated circuit with the voltage controller device.

Embodiments further provide the integrated circuit as a single chip or a multi-chip package. These may be applied on printed wiring boards. A packed chip may be a package of different integrated circuits or a packed stack of integrated circuits. Each integrated circuit may need its own measurement device. A further aspect of the invention is a module comprising such a system.

Another aspect of the invention is the use of such a system or such a module in an electronic device or a mobile communication device.

Yet, a further aspect of the invention is a computer program product comprising a computer program for determining a supply voltage level for operating an integrated circuit, the program comprising instructions operable to cause a processor to implement a described method with providing a high load condition to the integrated circuit, adjusting a first voltage level of the integrated circuit to provide a stable operation of the integrated circuit in the high load condition, and storing the adjusted first voltage level in the high load condition.

According to embodiments measuring a temperature of the integrated circuit in the high load condition, and storing the measured temperature in the high load condition is provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE DRAWINGS

Integrated circuits, such as for example Application Specific Integrated Circuits (ASIC), are designed to provide electronic devices with processing abilities. The integrated circuits are supplied with supply voltages which guarantee reliable operation in different operation conditions. The process and temperature variations in ASICs may be monitored. An upper voltage limit should be monitored to prevent over voltages. Running the system with the required system speed should be done using the lowest possible voltage to keep power consumption low. Delay tracking modules may indicate, whether the system is capable of operating with certain frequencies. These delay tracking modules may be provided by gate elements, which may measure the maximum frequency of a free running oscillator. This may be an indication of the delay within an integrated circuit. Voltage level adjustment may be software or hardware based. Systems need to be design in a robust way, allowing safe operations even with variations due to temperature, material, IR-drop, or others. Therefore, safety margins are applied to the voltage levels.

The operating points may be determined from the frequency and the supply voltage of integrated circuits. Measurements may be done with maximum and minimum load to find out IR-variation levels. Basically, these measurements may be done at any time, when the load is known. As the IR-drop changes dynamically, compensating for the IR-drop in its entirety dynamically is not possible. Therefore, safety margins need to be applied.

The voltage level required depends on the clocking frequency. The higher the clocking frequency, the higher the voltage that is necessary.

Figure 1A:
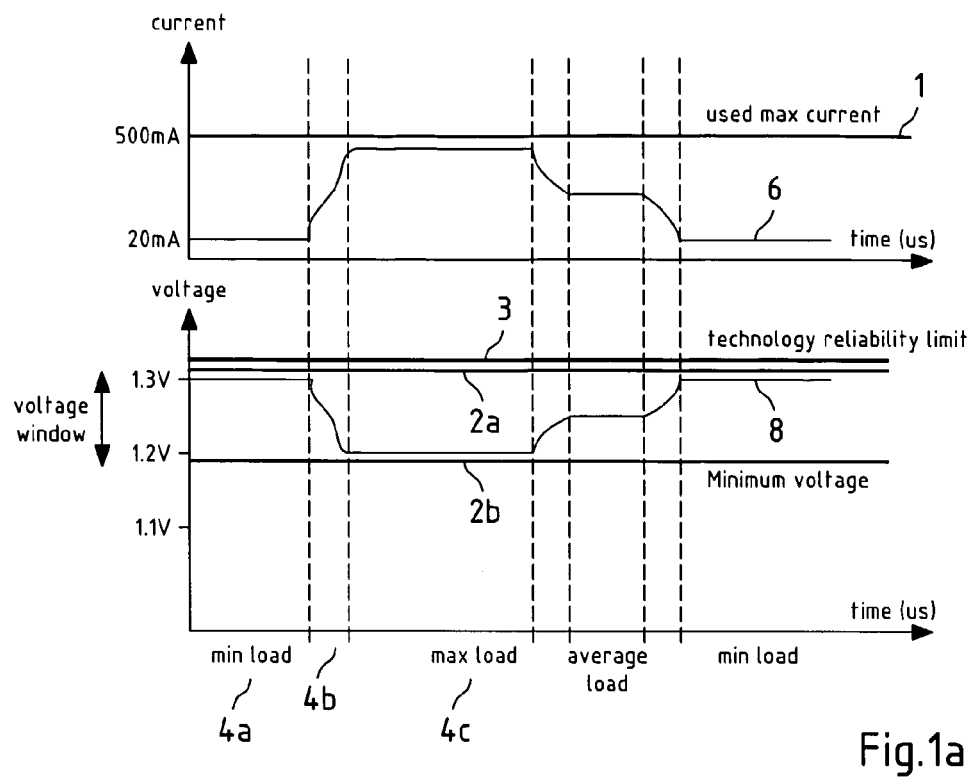
FIG. 1a shows a current and voltage variation in an integrated circuit with strong silicon.

The required voltage level may differ for different silicon. With strong silicon, higher speed is possible with less voltage. With weak silicon, higher voltage needs to be applied to attain the same system speed. With increasing temperature, the speed decreases with the same voltage. FIG. 1a shows a current curve 6 and a voltage curve 8 for different load conditions. The curves are functions of system load. The voltage level shown is the voltage level inside the ASIC seen by the transistors. The voltage will drop as the load increases. Since power is voltage times current, it is evident that with high load the most power is consumed. The voltage may in practice have some under and over-shoot or transients as the load increases and decreases. Also some ripple and/or noise may occur in the voltage curve. However, both variations are not shown in the diagrams for simplicity.

Further depicted are a maximum current level 1, a maximum ASIC voltage level 2a, a minimum ASIC voltage level 2b, a technology reliability voltage level 3, and different load conditions 4a, b, c.

The change in voltage drop and current rise depicted in FIG. 1a accounts for weak silicon. In transient condition 4b, where system load increases, it can be seen from FIG. 1a that the current slope 6 and the voltage slope 8 are steep. To account for this transient change, a voltage margin is necessary. These margins allow compensating for dynamic changes.

Figure 1B:
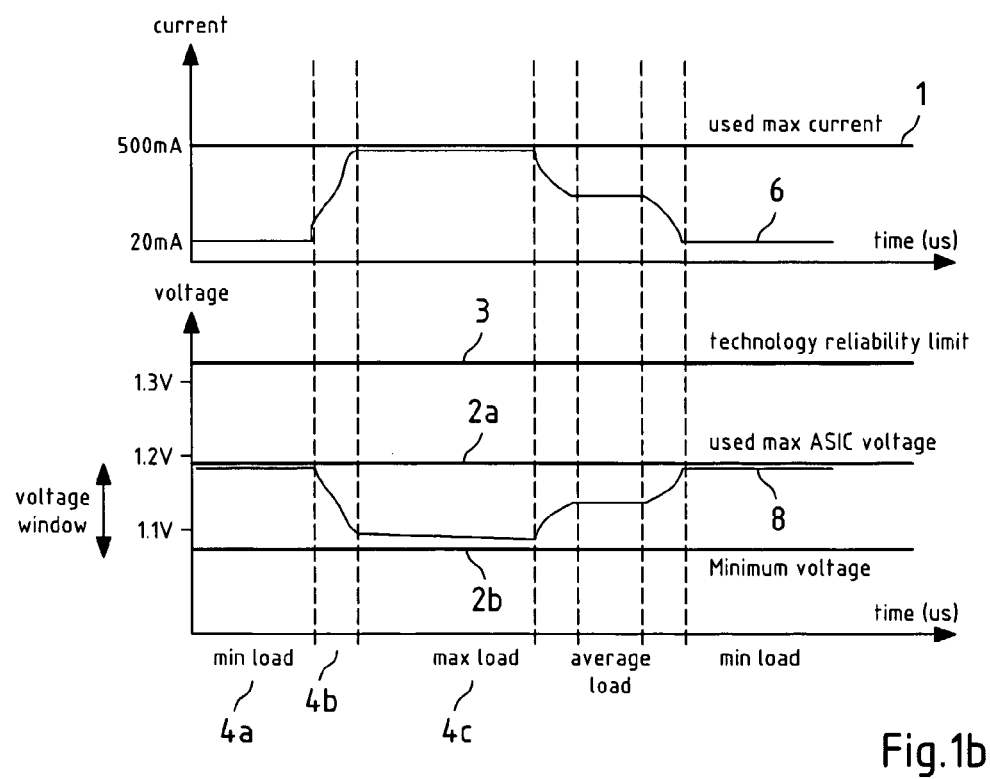
FIG. 1b shows a voltage and current variation in an integrated circuit with weak silicon.
Figure 2:
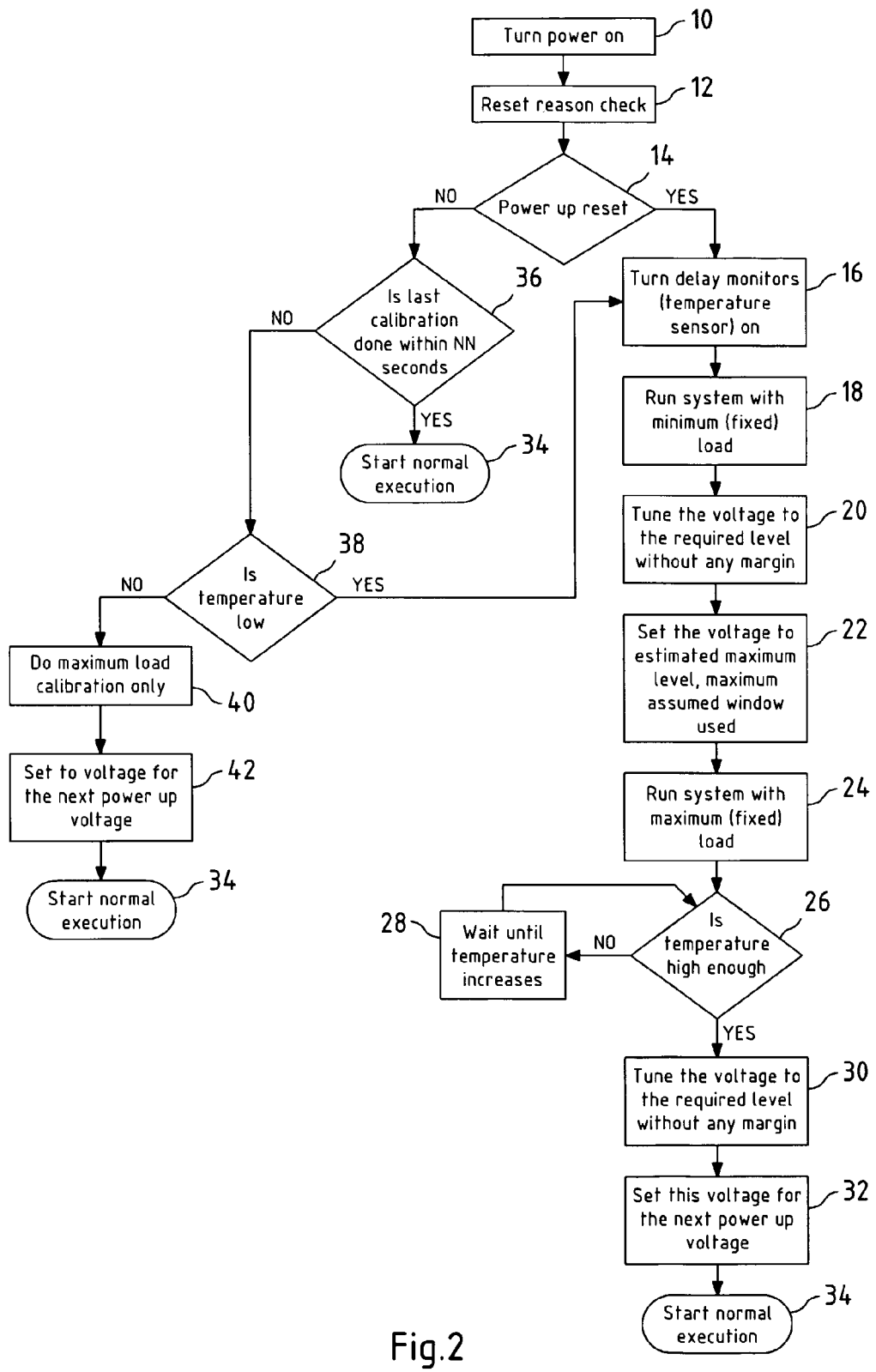
FIG. 2 is a flowchart of an inventive method.

FIG. 1b shows a current curve 6 and a voltage curve 8 for strong silicon. The strong silicon needs less voltage for the same operational speed. The power consumption is reduced compared to the weak silicon depicted in FIG. 1a. The voltage curve 6 and the current curve 8 are less steep in transient condition 4b. In addition, in high load condition, the required voltage is lower than for weak silicon. To account for different material and different operating condition, a method according to the invention as depicted in FIG. 2 may be applied. The depicted method requires voltage and temperature measurement in- or outside the ASIC. Also IR-drop measurement may be possible. The calibration sequence depicted may be run at start-up or any other mode, such as a calibration mode, after the ASIC reaches a fixed condition. The voltage margins may be reduced to close to zero in a high load condition by measuring or estimating the biggest voltage request. The measurement shown may be repeated in a known condition periodically, if power up seldom happens. Measurements may be included in a sleep sequence for example every 30 seconds, to track temperature variations.

Different ASICs are run with various operating conditions, and the voltage is adjusted in a way that it is always higher than the required voltage, and reliable operation is possible. As in the most cases the voltage is too high, since it needs to account for a sum of all unfavorable conditions, which are almost never true at once, the voltage may be decreased.

The inventive method decreases the margins in a high load condition and may finally remove the margin in the most important condition, which is the high load condition. In the high load condition, IR-drop and temperature margins may be selectively removed based on measurements on each ASIC. The invention allows decreasing the average voltage level applied to the ASIC. The voltage levels are set according to each ASIC, energy management chip and printed wiring board for particular ICs. The margins may be removed for each product separately.

Since variations in power management chip, integrated circuit and printed wiring board of different products are different, the voltage levels may differ in each design. This may cause some variations for consumer product power consumption. However, as the overall power consumption may be reduced, this variation may be neglected. System requirements are a voltage dependent delay monitor, which may be temperature and process dependent, as well as a voltage independent, temperature monitor.

At power on (10) and after a reset reason check (12), it is determined whether the reset is a power up reset or a soft reset (14). First, the voltage dependent and voltage independent delay monitors, which may include the temperature sensors, are turned on (16). However, only one of these delay monitors is necessary. The system is set to a minimum, fixed load condition, which is an artificial system operation (18). With the system load fixed to a minimum and known IR-drop and current, the voltage level is adjusted to the minimum level, where a reliable operation of the system is possible (20). This voltage level is applied without any margin. It is useful to apply the low load condition first, so as to keep ASIC temperature low. Applying a high load condition may cause ASIC temperature to rise, and a follow up low load test condition might have to wait until temperature decreases again. However, even with a high load condition, if the temperature is measured, the temperature effects may be accounted for. After the voltage level is stored, the voltage level is set to the maximum possible voltage (22) and the system is applied with a new fixed load condition, which is a maximum load (24). The maximum voltage may be necessary to provide stable operation when applying high load.

In the next step, the temperature is measured (26) and determined whether a certain temperature condition is reached (28). However, this may not be necessary. The ambient temperature may vary over a wide range. Insofar, the temperature may be measured at a certain point and the minimum and maximum temperature may be calculated. This may be possible, as the temperature effects are well known and allow calculating minimum and maximum temperature from a known starting point in the temperature curve. With a fixed IR-drop, known temperature and high load, the voltage level is adjusted to a level which still provides reliable operation (30). This voltage level is applied without any margin. The determined voltage level is stored for the next power up (32). Thereby, at the next power up, even with high temperature and high IR-drop, reliable operation may be provided.

With the stored voltage level for low load condition and known temperature as well as the voltage level for high load condition and the known temperature, normal execution may be started (34). During normal execution, load condition and temperature as well as IR-drop may be monitored. The voltage level may be adjusted according to the load condition. In high load condition, the voltage level may be applied without any margin. As in high load condition the previously determined voltage level accounts also for bad temperature condition and bad IR-drop, no safety margin is necessary. The system condition may not decrease further. By applying the voltage level without any safety margin, the current in the ASIC may be reduced, thus reducing power consumption. In case the measurements are done in maximum and minimum load condition, the values are fixed already, and the values for other cases may be calculated.

For a low load condition, the voltage margin may be increased gradually with the operation condition moving to more favorable conditions. This may be required, since the changes from a favorable operating condition to a less favorable operation condition may happen more quickly then can be compensated for. In other words, in the low load condition, the system load may increase quickly. To account for changes in system load and changes in working conditions, e.g. temperature rise, a voltage margin needs to be applied. The voltage margin allows compensating for changes in the load condition and the working condition. The faster the changes may be, the larger the margin needs to be.

The calibration cycle may take a few tens of milliseconds after power up or reset. This may increase the boot time but it is insignificant compared to the start-up time of the device.

In case the reset is not a power up reset (14) it is checked when the last calibration has been done (36). In case the last calibration was shortly before, normal execution is started (34). In case the time between the last calibration and the reset exceeds a certain threshold value, the temperature of the ASIC may be measured (38). If the temperature is low, calibration may be executed and the steps 16-30 are executed. In case the temperature is high, a maximum load calibration according to steps 22-30 are carried out (40). However, the change in temperature may as well be corrected without repeating the calibration. In addition, it may be possible to measure the temperature independently from the calibration cycle. After that the determined voltage is stored for the next power up (42). Finally, normal execution is started (34).

Figure 3:
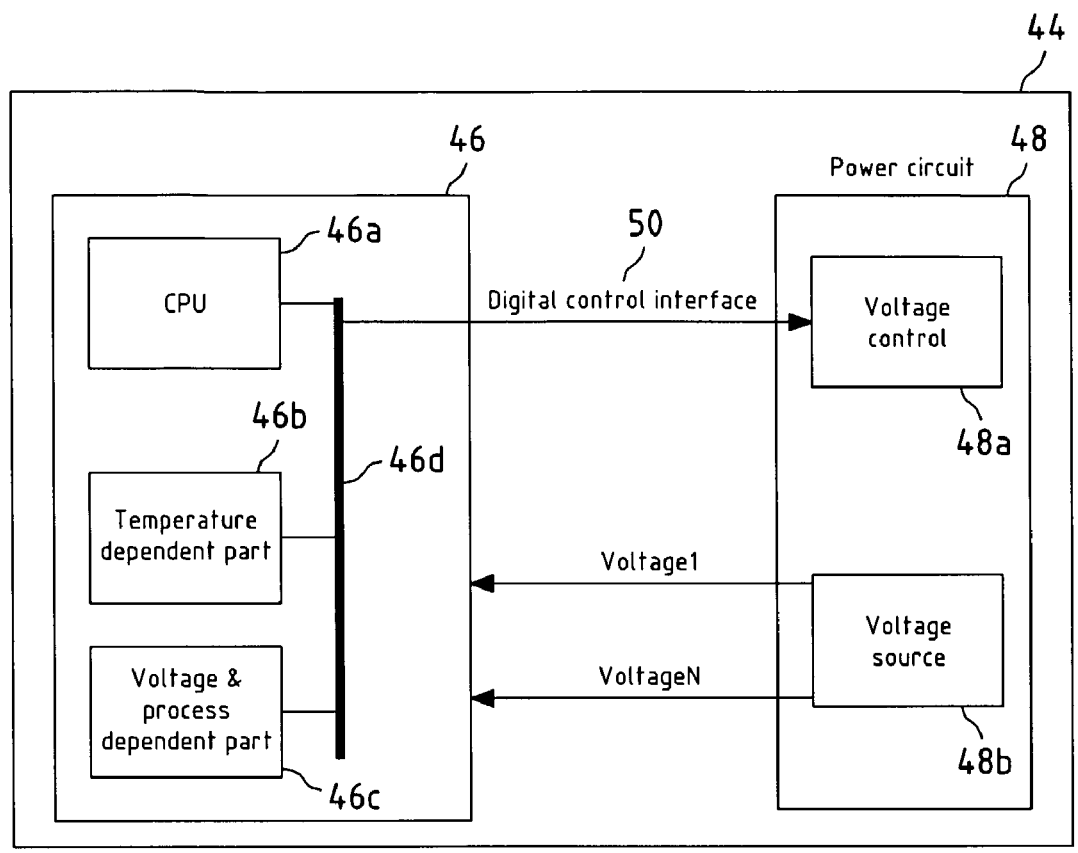
FIG. 3 is a block diagram of an inventive system.

FIG. 3 illustrates schematically a system 44 comprising an ASIC 46 and a power circuit 48. All elements may be included within one single die, package, module or circuit board. ASIC 46 comprises a central processing unit 46a, a temperature dependent delay monitor 46b and a temperature independent, voltage and process dependent delay monitor 46c. Central processing unit 46a, and delay monitors 46b, c are connected through an internal bus 46d. This internal bus 46d allows communication between these elements. A digital control interface connecting ASIC 46 with power circuit 48 is also included.

In power circuit 48 a voltage controller 48a and a voltage source 48b are included. Through digital control interface 50, voltage controller 48a runs a calibration cycle as shown in FIG. 2, where the respective voltages are applied to the ASIC 46 through voltage source 48b. During normal operation, voltage controller 48a controls voltage source 48b to apply a voltage to ASIC 46 depending on the measured conditions. The load condition is measured by delay monitor 46c and the temperature condition measured by delay monitor 46b. The system 44 may be run by software (not depicted).

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. Method comprising
providing a high load condition to an integrated circuit,
adjusting a first voltage level of the integrated circuit to provide a stable operation of the integrated circuit in the high load condition,
storing the adjusted first voltage level in the high load condition,
providing a low load condition to the integrated circuit,
adjusting a second voltage level of the integrated circuit to provide a stable operation of the integrated circuit in the low load condition,
storing the adjusted second voltage level in the low load condition, and
adjusting a supply voltage level during operation of the integrated circuit during operation depending on an operating point of the integrated circuit and the stored first and second voltage levels.

2. The method of claim 1, comprising measuring a temperature of the integrated circuit in the high load condition, and storing the measured temperature in the high load condition.

3. The method of claim 1, comprising adjusting a supply voltage level during operation of the integrated circuit in a high load condition with the stored first voltage level.

4. The method of claim 1, comprising adjusting a supply voltage level during operation of the integrated circuit in a high load condition with the stored first voltage level with a voltage margin of smaller than 10% of the first voltage level.

5. The method of claim 1, comprising adjusting a supply voltage level during operation of the integrated circuit in a high load condition with the stored first voltage level with a voltage margin of substantially zero.

6. The method of claim 1, comprising measuring one or more electric properties within the integrated circuit in the high load condition, and storing one or more corresponding measured electric properties.

7. The method of claim 6, wherein said one or more electric properties comprise an IR drop, or a current or both.

8. The method of claim 1, comprising measuring a temperature of the integrated circuit in the low load condition, and storing the measured temperature in the low load condition.

9. The method of claim 1, comprising adjusting a supply voltage level during operation of the integrated circuit in a low load condition with the stored second voltage level.

10. The method of claim 1, comprising adjusting a supply voltage level during operation of the integrated circuit in a low load condition with the stored second voltage level with a voltage margin greater than zero.

11. The method of claim 1, comprising adjusting the voltage level during operation of the integrated circuit in a low load condition with the stored second voltage level with a voltage margin greater than 10% of the second voltage level.

12. The method of claim 1, comprising measuring one or more electrical properties within the integrated circuit in the low load condition, and storing one or more corresponding measured electrical properties.

13. The method of claim 8, comprising determining an operation point of the integrated circuit for adjusting the voltage level from the measured temperature.

14. The method of claim 13, comprising determining the operation point for adjusting the voltage level from process and/or hardware load conditions.

15. The method of claim 13, comprising adjusting the voltage level during operation between the high load condition and the low load condition with a voltage level between the stored first voltage level and the second voltage level depending on the operation point.

16. System comprising:
an integrated circuit,
a voltage controller configured to control a voltage of the integrated circuit,
a load measuring device configured to measure a load condition of the integrated circuit, and
a storage configured to store a measured load condition, wherein
the voltage controller is configured to adjust a first voltage level in a high load condition to provide a stable operation of the integrated circuit and to adjust a second voltage level in a low load condition to provide a stable operation of the integrated circuit, and further to adjust the voltage level during operation depending on an operation point of the integrated circuit and the stored first and second voltage levels.

17. The system of claim 16, comprising a temperature dependent measuring device configured to measure a temperature of the integrated circuit, said storage arranged to store a measured temperature together with the measured load condition.

18. The system of claim 16, wherein the voltage controller is configured to adjust a supply voltage level during operation in a high load condition with a margin of smaller than 10% of the first voltage level.

19. The system of claim 16, wherein the voltage controller is configured to adjust a supply voltage level during operation in a high load condition with a margin of zero.

20. The system of claim 16, wherein the voltage controller is configured to adjust the voltage level between the first voltage level and the second voltage level depending on the operation point of the integrated circuit.

21. The system of claim 16, wherein the temperature dependent measuring device and the load measuring device are embedded within the integrated circuit.

22. The system of claim 16, wherein a digital control interface is provided for connecting the integrated circuit with the voltage controller device.

23. The system of claim 16, wherein the integrated circuit is a single chip or a multi-chip package.

24. Module comprising
an integrated circuit,
a voltage controller configured to control a voltage of the integrated circuit,
a load measuring device configured to measure a load condition of the integrated circuit, and
a storage configured to store a measured load condition, wherein
the voltage controller is configured to adjust a first voltage level in a high load condition to provide a stable operation of the integrated circuit and to adjust a second voltage level in a low load condition to provide a stable operation of the integrated circuit, and further to adjust the voltage level during operation depending on an operation point of the integrated circuit and the stored first and second voltage levels.

25. The module of claim 24, comprising a temperature dependent measuring device arranged to measure the temperature of the integrated circuit, said storage configured to store a measured temperature together with the measured load condition.

26. The module of claim 24, wherein the voltage controller is configured to adjust a supply voltage level during operation in a high load condition with a margin of smaller than 10% of the first voltage level.

27. The module of claim 24, wherein the voltage controller is configured to adjust a supply voltage level during operation in a high load condition with a margin of zero.

28. The module of claim 24, wherein the voltage controller is configured to adjust a supply voltage level for operating the integrated circuit between the first voltage level and the second voltage level depending on the operation point of the integrated circuit.

29. The module of claim 25, wherein the temperature dependent measuring device and the load measuring device are embedded within the integrated circuit.

30. The module of claim 24, wherein a digital control interface is provided for connecting the integrated circuit with the voltage controller device.

31. The module of claim 24, wherein the integrated circuit is a single chip or a multi-chip package.

32. Device comprising
an integrated circuit,
a voltage controller configured to control a voltage of the integrated circuit,
a load measuring device configured to measure a load condition of the integrated circuit, and
a storage configured to store a measured load condition, wherein
the voltage controller is configured to adjust a first voltage level in a high load condition to provide a stable operation of the integrated circuit and to adjust a second voltage level in a low load condition to provide a stable operation of the integrated circuit, and further to adjust the voltage level during operation depending on an operation point of the integrated circuit and the stored first and second voltage levels.

33. Computer program embodied in a computer readable medium comprising
instructions operable to cause a processor to provide a high load condition to the integrated circuit,
instructions operable to cause the processor to adjust a first voltage level of the integrated circuit to provide a stable operation of the integrated circuit in the high load condition,
instructions operable to cause the processor to store the adjusted first voltage level in the high load condition,
instructions operable to cause the processor to provide a low load condition to the integrated circuit;
instructions operable to cause the processor to adjust a second voltage level of the integrated circuit to provide a stable operation of the integrated circuit in the low load condition;
instructions operable to cause the processor to store the adjusted second voltage level in the low load condition; and
instructions operable to cause the processor to adjust the voltage level of the integrated circuit depending on an operation point of the integrated circuit and the stored first and second voltage levels.

34. The computer program of claim 33, comprising instructions operable to cause the processor to measure a temperature of the integrated circuit in the high load condition, and instructions operable to cause the processor to store the measured temperature in the high load condition.

35. Apparatus comprising
means for providing a high load condition to the integrated circuit;
means for adjusting a first voltage level of the integrated circuit to provide a stable operation of the integrated circuit in the high load condition;
means for storing the adjusted first voltage level in the high load condition;
means for providing a low load condition to the integrated circuit;
means for adjusting a second voltage level of the integrated circuit to provide a stable operation of the integrated circuit in the low load condition;
means for storing the adjusted second voltage level in the low load condition; and
means for adjusting the voltage level of the integrated circuit depending on an operation point of the integrated circuit and the stored first and second voltage levels.

36. The apparatus of claim 35, further comprising
means for measuring a temperature of the integrated circuit in the high load condition; and
means for storing the measured temperature in the high load condition.

37. The apparatus of claim 35, further comprising means for adjusting the voltage level during operation in a high load condition with the stored first voltage level.

38. The apparatus of claim 35, further comprising
means for measuring a temperature of the integrated circuit in the low load condition; and means for storing the measured temperature in the low load condition.

39. The apparatus of claim 35, further comprising means for adjusting the voltage level during operation in a low load condition with the stored second voltage level.

40. The method of claim 35, further comprising means for adjusting the voltage level during operation between the high load condition and the low load condition with a voltage level between the stored first voltage level and the second voltage level depending on the operation point.

41. The device of claim 32, wherein said device comprises a mobile communication device.

* * * * *